Figure 1:
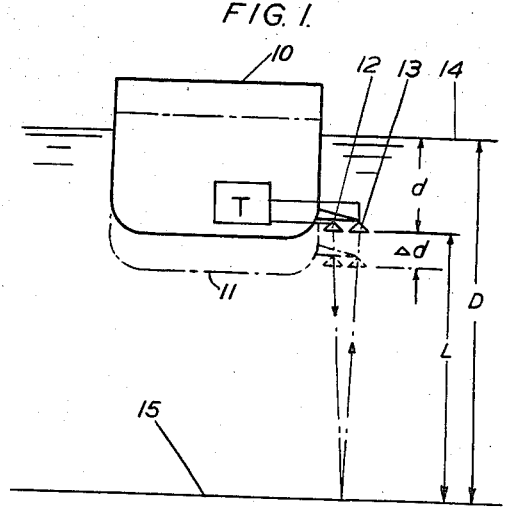

Inventor
S. NAKANO - I. YOSANO
By R. P. Morris
Attorney

Feb. 21, 1956 S. NAKANO ET AL 2,736,000
SYSTEM OF DEPTH MEASUREMENT IN THE
ACOUSTIC FATHOMETER OR THE LIKE
Filed May 22, 1952 2 Sheets-Sheet 2

Inventor
S. NAKANO - I. YOSANO

By RP Morris
Attorney

United States Patent Office 2,736,000
Patented Feb. 21, 1956

2,736,000

SYSTEM OF DEPTH MEASUREMENT IN THE ACOUSTIC FATHOMETER OR THE LIKE

Shinpei Nakano and Iku Yosano, Minato-ku, Tokyo, Japan, assignors to International Standard Electric Corporation, New York, N. Y., a corporation of Delaware Application May 22, 1952, Serial No. 289,262

Claims priority, application Japan May 24, 1951

18 Claims. (Cl. 340—3)

This invention relates generally to depth measuring devices such as fathometers, and more particularly to an improved method of accurately measuring the depth of shallow water, such as in a harbor.

A primary object of the invention resides in the provision of an improved method of employing an acoustic fathometer to obtain a depth reading which is automatically corrected for list and draft variation of a vessel on which it is mounted.

Another object of the invention is to provide an improved acoustic fathometer wherein errors heretofore encountered due to variation in draft, inclination and roll of a ship to which the device is mounted are substantially reduced or eliminated.

A further object of the invention resides in so employing a reflected wave that the above mentioned errors are automatically eliminated from the fathometer reading.

Other objects and advantages of the invention are generally to improve and simplify methods of depth measurement and fathometers for recording depth for one or more of the above mentioned purposes.

In the drawings, in which like parts are identified by the same reference numerals:

Fig. 1 illustrates diagrammatically the prior art systems of depth measurement.

Figs. 2, 3, 4 and 5 diagrammatically illustrate various modifications and adaptations of the improved methods herein taught, and the improved fathometer.

It has heretofore been the general practice to mount acoustic fathometers, which are simply devices in corporating a transmitter and a receiver of acoustic waves, to a portion of a ship or the like below the normal water line. The transmitter sends out an acoustic wave for transmission through water, and which the receiver picks up after reflection from the bottom or bed, to actuate the receiver. A simple computation involving the time lag between transmission and reception and a known constant representing the velocity of sound through the water enables the fathometer to indicate the depth of the water. The advantages residing in the employment of devices of this type in harbors and in other shallow water is self-evident, and when the depth of the water is many times that of the ship's draft, certain inaccuracies due to the inability of the ship to retain an even keel are relatively unimportant. In shallow water such errors are magnified and might result, in very shallow water, in a ship running aground due to the resultant inaccuracy of the fathometer reading. The limitations of the devices heretofore known have, of course, been apparent to persons skilled in the art, and while various means have been suggested for correction of these errors, the resultant structural complicity, high cost, and other factors have precluded general adoption of fathometers which automatically correct for variations in draft, and cyclic roll.

Referring to Fig. 1, a buoyant vehicle such as a ship is illustrated in heavy lines at 10, with dotted lines 11 illustrating the same ship at different draft due, for example, to cargo loading or pitch. A fathometer comprising a transmitter 12 and a receiver 13 is diagrammatically shown with the units supported by a lateral bracket affixed to the hull of ship 10. The water surface is illustrated at 14 with the bottom of the relatively shallow body of water illustrated at 15. Transmitter 12 may be assumed to be of the type which emits a supersonic signal in the arrow direction downwardly to bottom 15 from which it is reflected upwardly to be detected by receiver 13, the paths being indicated by the dotted lines shown. T is a device of any known type for measuring the time lag between the transmission and reception of the signal. The total depth of the water is illustrated at D with the distance between the water surface and the transmitter-receiver illustrated by $d$, while L represents the distance between the fathometer and the bottom 15, 2L representing the total travel of a supersonic signal emitted by transmitter 12 and picked up by receiver 13, hence $$2L = 2(D-d) \qquad (1)$$

or $$D = L + d \qquad (2)$$

The depth D is, therefore, obtained by measuring L and adding the value of $d$. Assuming a change in draft to the dotted line position shown at 11, the value of L decreases by the amount $\Delta d$ and the value of $\Delta d$ must be added to the value of $d$ to then obtain the value of D as above. However, since there is normally no provision of calculation of $\Delta d$ the depth D is calculated by Equation 2 utilizing the measured value of L and disregarding the increment $\Delta d$ hence the value of D is less than the actual depth measurement by an amount represented by $\Delta d$. Conversely, if the ship's draft should be decreased over that shown in respect to those shown in heavy lines, error, larger than the actual value, will be introduced.

It is apparent that a fathometer fixedly attached to a ship may, under some conditions, be constantly subjected to a vertical displacement amounting to several yards and that, therefore, the error as represented by $\Delta d$ introduced is formidable and precludes accurate readings except under the most ideal conditions.

The improved method of obtaining fathometer readings, as herein taught, has been found highly efficient in automatically eliminating the above mentioned introduced errors even under the most adverse conditions.

Figure 2:
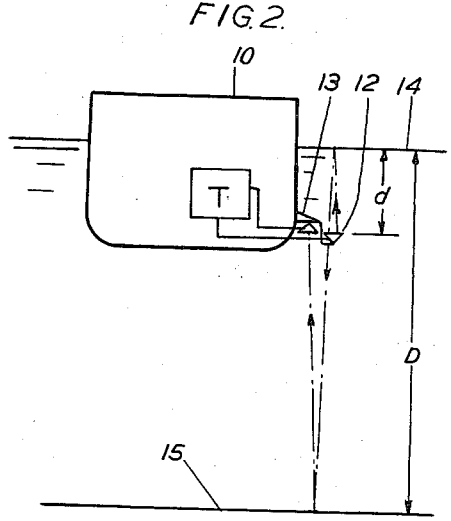

Referring to Fig. 2, and assuming the same variables as above described, the transmitter 12 is shown inverted for emission of an upwardly directed signal, shown dotted, with the signal reflected from the water's surface downwardly as shown by the arrow to the bottom 15 to again be reflected upwardly for detection by receiver 13, the actuating diaphragms of the transmitter 12 and the receiver 13 being positioned in a common horizontal plane as shown.

It is apparent that the total distance traversed by an acoustic wave emitted from transmitter 12, reflected from surface 14 to the bottom 15 and then returned to receiver 13 can be expressed by $$2L = d + D + D - d \qquad (3)$$

hence $$D = L \qquad (4)$$

The depth D can, therefore, be obtained directly by measuring L independent of the value of D which represents the variation of distance between the water surface and the transmitter-receiver, since Equation 4 does not include $d$ and in this manner the previous source of error is eliminated.

Alternately, the transmitter-receiver may be inverted with the transmitter at 13 and the receiver at 12 as shown in Fig. 2. The wave is then first transmitted to the bottom 15 to be reflected back to the upper surface 14 and again reflected downwardly to the receiver 12 to obtain a like result.

Figure 3:
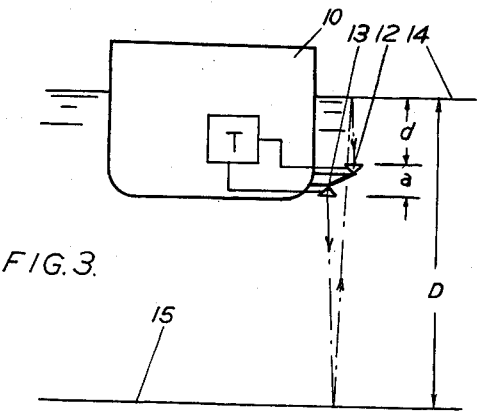

As shown in Fig. 3, the transmitter and receiver may be spaced in a vertical direction, in which case, distance "a" represents the distance therebetween, with $d$ representing the distance between the water surface 14 and the transmitter 12, and D representing the total water depth as before. With this arrangement, the distance of impulse travel may be represented as $$2L = d + D + (D - d - a) \quad (5)$$

hence $$D = L + \frac{a}{2} \quad (6)$$

Although the compensation by $a$ is necessary to obtain the value of D from the measured value of L no errors are introduced, since $a$ is a constant value.

Since in each of the methods above described, the surface of the water is utilized as a reflecting surface, it is apparent that a certain error may be introduced by waves, or that under rough conditions, the signal wave will undergo a decay in strength due to the scattering thereof by a turbulent surface which results in diffraction of the waves. This source of error may be eliminated as shown in Figs. 4 and 5.

Figure 4:
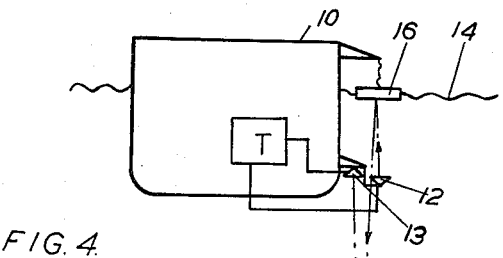

Fig. 4 illustrates a hollow and floatable flat bottomed reflector 16 which may be secured to the side of the ship in a suitable manner to be drawn thereby while positioned directly above the transmitter 12 with the impulse wave traveling upwardly in the arrow direction to be reflected by the bottom surface of a float 16 downwardly to bottom 15 and then upwardly to receiver 13. A reading is obtained in the manner described in connection with Fig. 2, but due to the float, the detrimental effect of the waves is greatly minimized.

Figure 5:
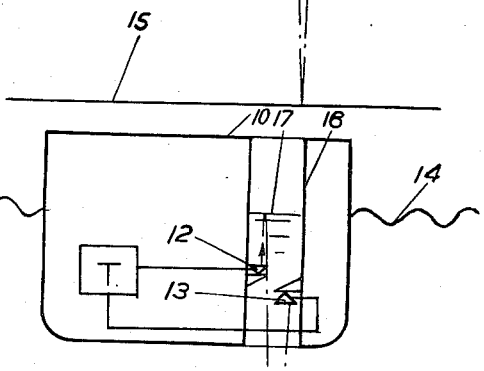

As shown in Fig. 5, a ship or other buoyant object is provided with a vertical passage 18 with opposite ends open to the water and atmosphere respectively. Both the transmitter 12 and the receiver 13 are fixed within passage 18, shown as cylindrical, with the transmitter 12 facing upwardly and receiver 13 facing downwardly. As is apparent with this construction, the surface of the water shown wavy at 14 is smooth within the passage 18 as shown at 17, and as is further apparent, the water level within the passage remains unaffected by such factors as draft, pitch and roll of the ship. An accurate depth reading may be obtained in the manner described above with any of the alternate methods of positioning the transmitter and receiver units as desired.

While I have described above the principles of my invention in connection with specific apparatus, it is to be clearly understood that this description is made only by way of example and not as a limitation to the scope of my invention as set forth in the objects thereof and the accompanying claims.

What is claimed is:

1. A method of measuring the depth of a body of fluid consisting of emitting a signal from a position below the fluid level and in a direction to effect, by reflection, double reversal of direction thereof between the upper and lower surfaces of said fluid and a return of said signal to approximately the location from which it was emitted, detecting said signal after said double reversal thereof and measuring the time lag between the transmission and reception thereof as indicative of the distance between said upper and lower fluid surfaces.

2. The method of claim 1 wherein said signal is emitted and received in a common horizontal plane.

3. The method of claim 1 wherein said signal is received at a position vertically spaced from the point of emission.

4. A method of computing the depth of a fluid body consisting of the steps of emitting a signal downwardly from a point within said body and beneath the upper surface thereof to effect reflection of said signal from the bottom surface of said body and reversal thereof to the upper surface thereof and a second reversal downwardly, detecting said signal after the second reversal thereof, and recording the time of travel of said signal through said fluid body as indicative of the depth thereof.

5. The method of claim 4 wherein said point of signal emission and the point of signal detection lie in the same horizontal plane.

6. The method of claim 4 wherein the point of emission and the point of detection are mutually spaced vertically within said fluid.

7. A method of computing the depth of a fluid body consisting of the steps of emitting a signal upwardly from a point within said body and beneath the upper surface thereof to effect reflection of said signal from the upper surface of said body and reversal thereof to the lower surface and a second reversal upwardly, detecting said signal after the second reversal thereof and recording the time of travel of said signal through said fluid body as indicative of the depth thereof.

8. The method of claim 7 wherein said point of signal emission and the point of signal detection lie in the same horizontal plane.

9. The method of claim 7 wherein the point of emission and the point of detection are mutually spaced vertically within said fluid.

10. A method of computing the depth of a fluid body consisting of the steps of floating a buoyant body thereon, emitting a signal from a point spaced below said buoyant body and in a direction to effect a double reversal of direction between the bottom surface of said fluid body and the bottom surface of said buoyant body, detecting said signal, after said double reversal, at a point below the bottom surface of said buoyant body, and computing the time lag between the instant of signal transmission and the instant of signal detection as indicative of the depth of said fluid.

11. The device of claim 19 including a second buoyant body having means associated therewith for the transmission and reception of said signal, said two buoyant bodies being cooperatively connected for the maintenance of said first buoyant body at a position on the surface of said fluid substantially above the signal transmitting and receiving means.

12. A method of computing the depth of a fluid body from a buoyant container floatable therein consisting of the steps of providing an open passage through said container to allow said fluid to seek its level therein, positioning a signal transmitter and a signal receiver within said passage and below the surface of the fluid therein, emitting a signal from said transmitter in a direction to effect a double reflection between the upper and lower surfaces of said fluid before return of the signal to said receiver, detecting said signal arrival at said receiver, and utilizing the time of passage from said transmitter through said doubly reflected path to said receiver as indicative of the depth of said fluid.

13. The method of claim 12 wherein said floatable container is provided with a vertical passage extending therethrough and said receiver and transmitter are supported within said passage below the level of the fluid therein.

14. The method of claim 12 wherein said receiver and transmitter are vertically spaced within said passage.

15. In combination with a floatable vessel, a depth fathometer comprising a signal transmitter supported by said vessel below the surface of fluid in which said vessel floats, and in contact therewith, a signal receiver supported by said vessel in laterally spaced relation to said transmitter at a position below the surface of said fluid and contact therewith, said transmitter being positioned to emit signals in one vertical direction and said receiver being positioned to receive signals from an opposite direction.

16. The device of claim 15 wherein said transmitter and said receiver are supported by said vessel in a common horizontal plane.

17. The device of claim 15 wherein said receiver and transmitter are supported by said vessel in vertically spaced relation.

18. A device for computing the depth of a fluid body comprising a buoyant body adapted to float thereon, means for emitting a signal from a point spaced below said buoyant body and in a direction to effect a double reversal of direction between the bottom surface of said fluid body and the bottom surface of said buoyant body, means for detecting said signal after said double reversal, at a point below the bottom surface of said buoyant body and means for computing the time lag between the instant of signal transmission and the instant of signal detection as indicative of the depth of said fluid body.

References Cited in the file of this patent

UNITED STATES PATENTS

| | | |
|---|---|---|
| 2,567,229 | Morse | Sept. 11, 1951 |

FOREIGN PATENTS

| | | |
|---|---|---|
| 236,023 | Great Britain | July 2, 1925 |